United States Patent
Peters

(10) Patent No.: US 9,255,603 B2
(45) Date of Patent: Feb. 9, 2016

(54) TEST EQUIPMENT WITH HOUSING DAMPING SYSTEM

(71) Applicant: UNITED TECHNOLOGIES CORPORATION, Hartford, CT (US)

(72) Inventor: Brace E. Peters, Willington, CT (US)

(73) Assignee: United Technologies Corporation, Hartford, CT (US)

( * ) Notice: Subject to any disclaimer, the term of this patent is extended or adjusted under 35 U.S.C. 154(b) by 25 days.

(21) Appl. No.: 14/172,033

(22) Filed: Feb. 4, 2014

(65) Prior Publication Data
US 2014/0226930 A1  Aug. 14, 2014

Related U.S. Application Data

(60) Provisional application No. 61/762,907, filed on Feb. 10, 2013.

(51) Int. Cl.
F16C 27/00 (2006.01)
F16C 33/58 (2006.01)
F01D 25/04 (2006.01)
F02C 7/06 (2006.01)
F01D 25/28 (2006.01)
F16C 35/04 (2006.01)

(52) U.S. Cl.
CPC ............... *F16C 27/00* (2013.01); *F01D 25/04* (2013.01); *F01D 25/285* (2013.01); *F02C 7/06* (2013.01); *F16C 33/58* (2013.01); *F05D 2260/12* (2013.01); *F05D 2260/96* (2013.01); *F05D 2300/501* (2013.01); *F16C 35/042* (2013.01)

(58) Field of Classification Search
CPC .......... F16C 27/00; F16C 27/04; F16C 27/06; F16C 27/066; F16C 19/24; F16C 33/58; F16C 35/042; F02C 7/06; F01D 25/04; F01D 25/285; F05D 2260/12; F05D 2260/96; F05D 2300/501
See application file for complete search history.

(56) References Cited

U.S. PATENT DOCUMENTS

| | | | | |
|---|---|---|---|---|
| 642,704 A * | 2/1900 | Miller | ............................. | 295/10 |
| 2,012,997 A * | 9/1935 | Junkers | ......................... | 384/536 |
| 2,487,343 A * | 11/1949 | Kopf | ............................. | 384/535 |
| 2,530,323 A * | 11/1950 | Boyd | ............................. | 384/611 |
| 2,556,317 A * | 6/1951 | Cook | ............................. | 384/535 |
| 3,494,678 A * | 2/1970 | Fekete et al. | .................. | 384/222 |
| 3,508,800 A * | 4/1970 | Beerli | ............................ | 384/235 |
| 4,556,331 A * | 12/1985 | Munde et al. | ................. | 384/453 |
| 4,688,989 A * | 8/1987 | Kondo et al. | .............. | 415/124.2 |
| 4,923,313 A * | 5/1990 | Bergling | ........................ | 384/571 |
| 4,963,039 A * | 10/1990 | Daugherty | .................... | 384/224 |
| 5,433,536 A * | 7/1995 | Bergling | ....................... | 384/620 |
| 5,503,479 A | 4/1996 | Ide | | |
| 5,556,208 A | 9/1996 | Ide | | |
| 5,660,481 A | 8/1997 | Ide | | |

(Continued)

*Primary Examiner* — Alan B Waits
(74) *Attorney, Agent, or Firm* — Carlson, Gaskey & Olds, PC

(57) ABSTRACT

A machine has an outer housing that receives a drive shaft. A bearing housing supports a bearing. The drive shaft is mounted within the bearing and the outer housing. Attachment members extend between the outer housing and the bearing housing. A selected damping includes an elastomeric ring attached to a surface of a bearing housing and an outer housing. A selectively moveable plate is connected to the outer housing and the bearing housing. The plate is selectively moveable from a position at which it engages the elastomeric ring to a point at which it is spaced from the elastomeric ring.

8 Claims, 4 Drawing Sheets

(56) References Cited

U.S. PATENT DOCUMENTS

| | | | |
|---|---|---|---|
| 5,800,070 A * | 9/1998 | Nilsson et al. | 384/535 |
| 7,389,579 B2 * | 6/2008 | Rode | 29/724 |
| 7,771,126 B2 * | 8/2010 | Faass et al. | 384/535 |
| 7,828,512 B2 * | 11/2010 | Eilers et al. | 415/104 |
| 7,857,522 B2 * | 12/2010 | Osgood et al. | 384/586 |
| 8,308,364 B2 * | 11/2012 | Tecza et al. | 384/99 |
| 9,004,776 B2 * | 4/2015 | Capoldi et al. | 384/620 |
| 2008/0260318 A1 * | 10/2008 | Schuh et al. | 384/618 |
| 2009/0139370 A1 * | 6/2009 | Sugiura et al. | 74/606 R |
| 2010/0266427 A1 * | 10/2010 | Haecker et al. | 417/273 |
| 2011/0150381 A1 * | 6/2011 | Matsumoto et al. | 384/517 |
| 2014/0023305 A1 * | 1/2014 | Frank | 384/569 |
| 2014/0037237 A1 * | 2/2014 | von Wolske | 384/397 |
| 2014/0226930 A1 * | 8/2014 | Peters | 384/582 |
| 2015/0030277 A1 * | 1/2015 | Pick et al. | 384/558 |

* cited by examiner

TEST EQUIPMENT WITH HOUSING DAMPING SYSTEM

RELATED APPLICATION

This application claims priority to U.S. Provisional Application No. 61/762,907, filed Feb. 10, 2013.

BACKGROUND OF THE INVENTION

This application relates to a damping system for a test equipment housing that can be selectively engaged.

A known piece of test equipment is utilized for operating a gas turbine engine compressor section such that the section can be tested. Generally, an input shaft is driven by a source of rotation, and is connected to the compressor rotor, and drives the compressor rotor to rotate. Sensors, or other test equipment sense conditions and operation of the compressor rotor.

In the known piece of test equipment, there are two roller bearings which mount the shaft within a housing. A bearing housing associated with one of the bearings is bolted to an outer housing. The bolted connection transmits vibration between the bearing housing to the outer housing.

SUMMARY OF THE INVENTION

In a featured embodiment, a machine has an outer housing receiving a drive shaft, and at least one bearing housing supporting at least one bearing. The shaft is mounted within the at least one bearing, and the outer housing is outward of the at least one bearing housing. Attachment members extend between the outer housing and the bearing housing. A selected damping system includes an elastomeric ring attached to a surface on one of the bearing housing and the outer housing, and a selectively moveable plate is connected to the other of the outer housing and bearing housing. The plate is selectively moveable from a position at which it engages the elastomeric ring and to a point at which it is spaced from the elastomeric ring.

In another embodiment according to the previous embodiment, the machine drives a component to be tested.

In another embodiment according to any of the previous embodiments, the component to be tested is a compressor rotor for a gas turbine engine.

In another embodiment according to any of the previous embodiments, there are a pair of spaced elastomeric ring sections mounted to one of the housings.

In another embodiment according to any of the previous embodiments, the plate includes a plurality of plate portions each including an actuator member.

In another embodiment according to any of the previous embodiments, the actuator member includes a piston which is driven by a spring to move the plate portion towards the elastomeric ring.

In another embodiment according to any of the previous embodiments, an adjustment member may be adjusted to cause the piston to move inwardly or outwardly of an actuator housing to move the plate portions towards and away from the elastomeric ring.

In another embodiment according to any of the previous embodiments, the adjustment member is threadably mounted within an actuator member housing.

In another embodiment according to any of the previous embodiments, the actuator member includes a piston which is driven by a spring to move the plate portion towards the elastomeric ring.

In another embodiment according to any of the previous embodiments, an adjustment member may be adjusted to cause the piston to move inwardly or outwardly of an actuator housing to move the plate portions towards and away from the elastomeric ring.

In another embodiment according to any of the previous embodiments, the adjustment member is threadably mounted within an actuator member housing.

In another embodiment according to any of the previous embodiments, the housing is the bearing housing.

These and other features may be best understood from the following specification and drawings, the following which is a brief description.

DETAILED DESCRIPTION

Figure 1:
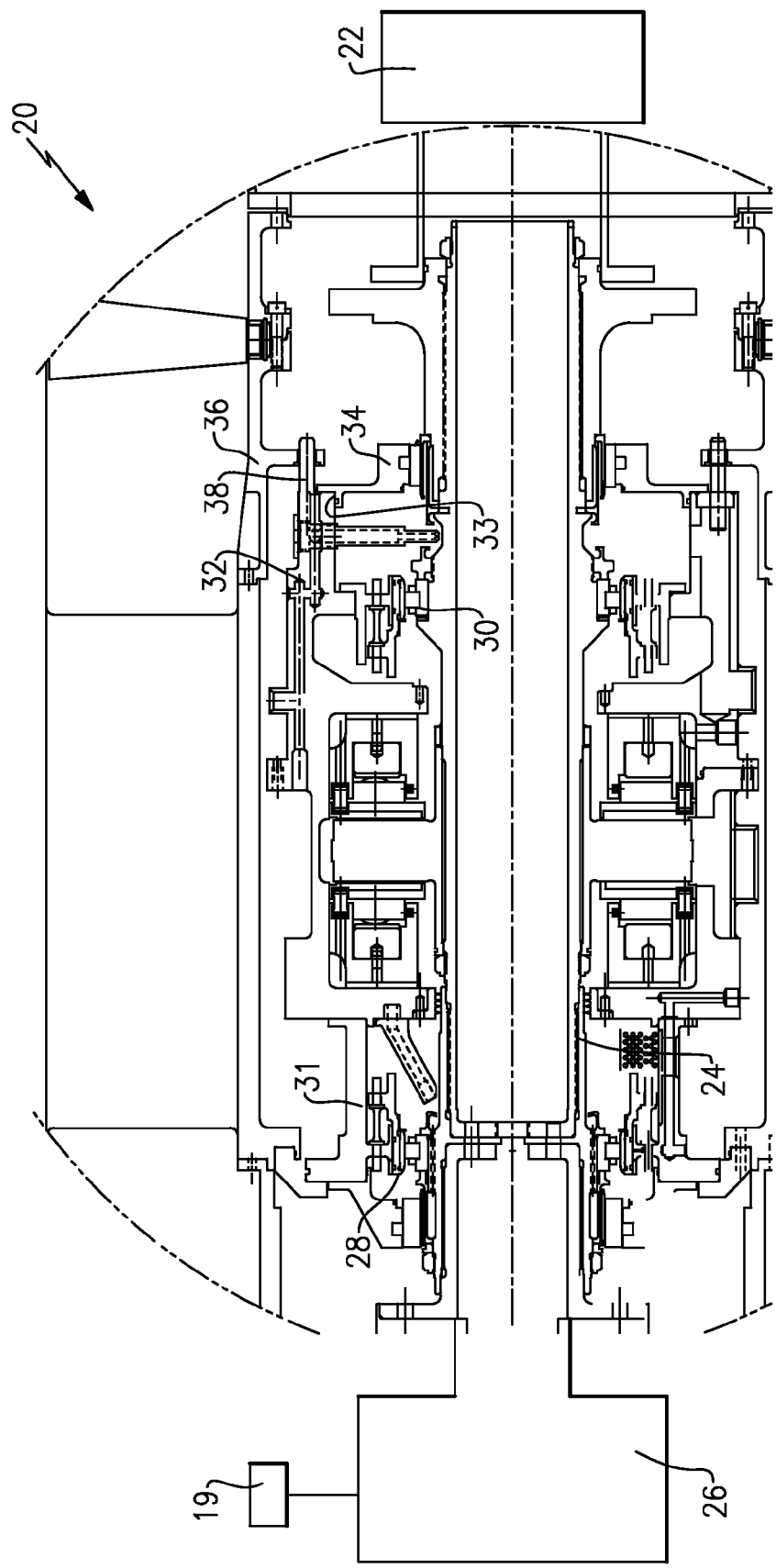
FIG. 1 shows a known machine.

A test machine 20 is illustrated in FIG. 1 receiving an input 22 which drives a shaft 24 to rotate. Shaft 24 is shown schematically connected to a compressor rotor 26 for a gas turbine engine. The source of rotation 22 drives the shaft 24 to in turn drive the compressor rotor 26. Sensors 19 are shown schematically, but sense operation of the compressor rotor as it is driven.

Roller bearings 28 and 30 mount the shaft 24 within bearing housings 31 and 32. Bearing housing 32 is attached at 38 to an outer housing 36 by being bolted. The bolted connection 38 transmits vibration between the housings 32 and 36. A housing 34 is force fit into a bore 33 in the housing 32, and transmits vibration from the shaft to the housing 32.

Figure 2A:
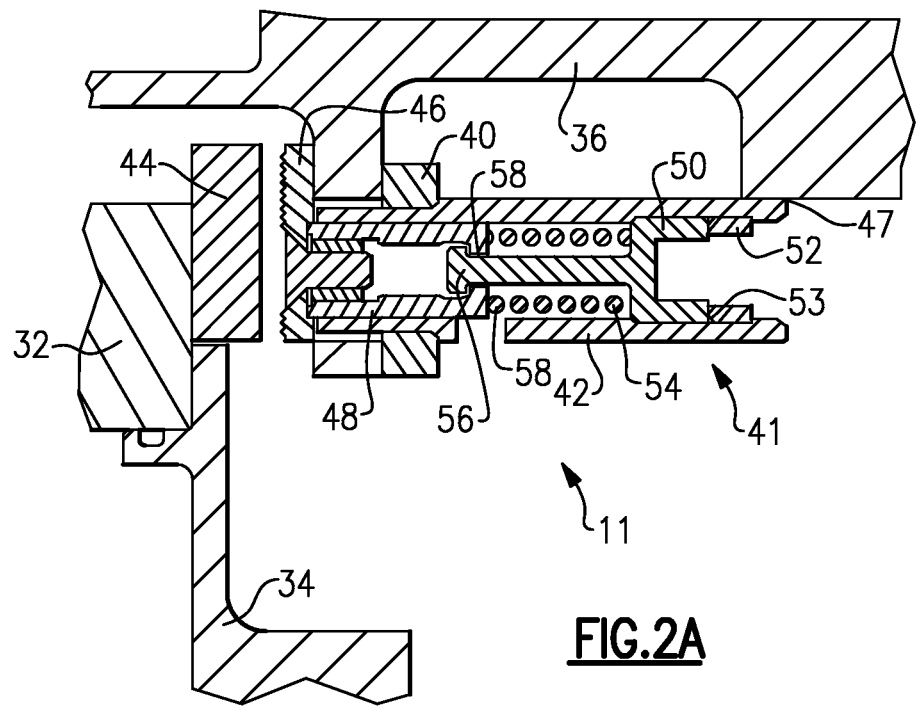
FIG. 2A shows a vibration dampener.

As shown in FIG. 2A, a selective damping system 11 is inserted between the housing 32 and the housing 36. An elastomer ring 44 is secured to the housing 32, such as by bolting or adhesive. An actuator housing 42 is secured with a plate 40 to the housing 36. A weld connection 47 screws the housing 42 at an opposed end. A piston 48 is connected to a plate 46 which is illustrated spaced from the elastomer ring 44. An adjustable member 50 includes a guide pin 56 received in an opening 58 in the piston 48. A spring 54 has one end fixed to the adjustable member 50, and the other end reacting against a surface on the piston 48. A lock ring 52 holds the adjustable member 50 within a threaded bore 53 of the housing 42.

Figure 2B:
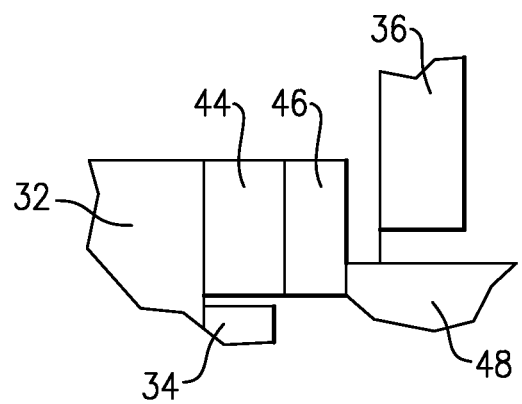
FIG. 2B shows an actuated position.

Under some conditions it may not be necessary to achieve damping in the machine 20. However, under other conditions, the damping would be desirable. A head of the threaded member 50 may be turned to move the threaded member to the left as shown in FIG. 2, and as this occurs the spring 54 will bias the piston 48 to the left bringing the plate 46 into contact with the elastomeric ring 44. This position is shown schematically in FIG. 2B. This will then dampen vibrations from being transmitted between the housings 32 and 36.

Figure 3:
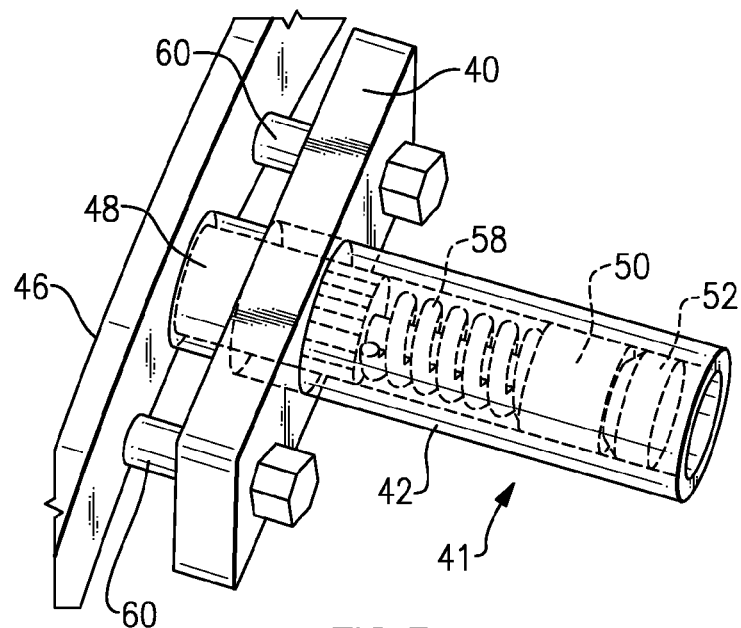
FIG. 3 shows an actuator.

FIG. 3 shows the actuator 41, and components 50, 52, 48, and 58. As also shown, there are pins 60 extending between the lock plate 40, and the ring 46.

Figure 4:
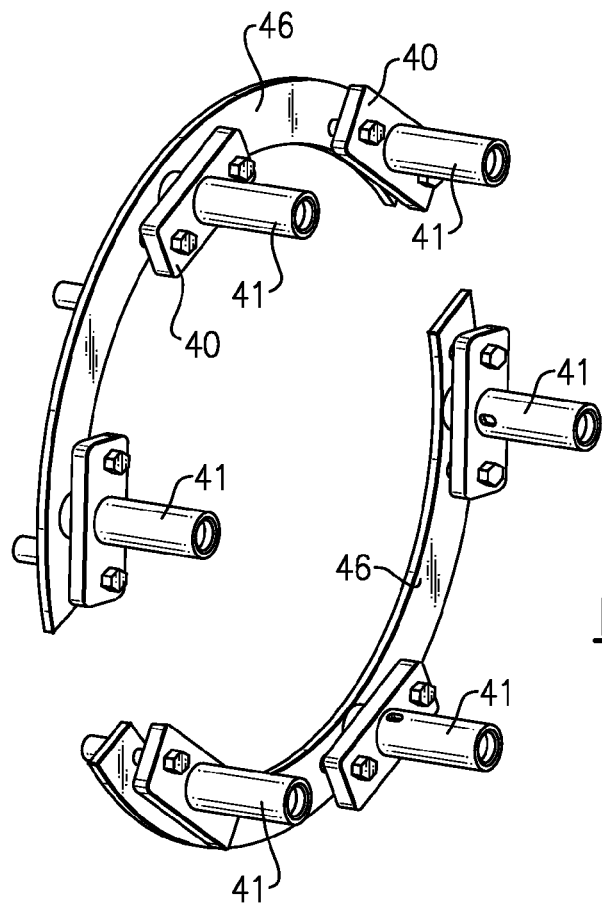
FIG. 4 shows an assembly.

As shown in FIG. 4, the plate 46 is actually formed of two semi-circular portions and each include a plurality of actuator assemblies 41.

Figure 5:
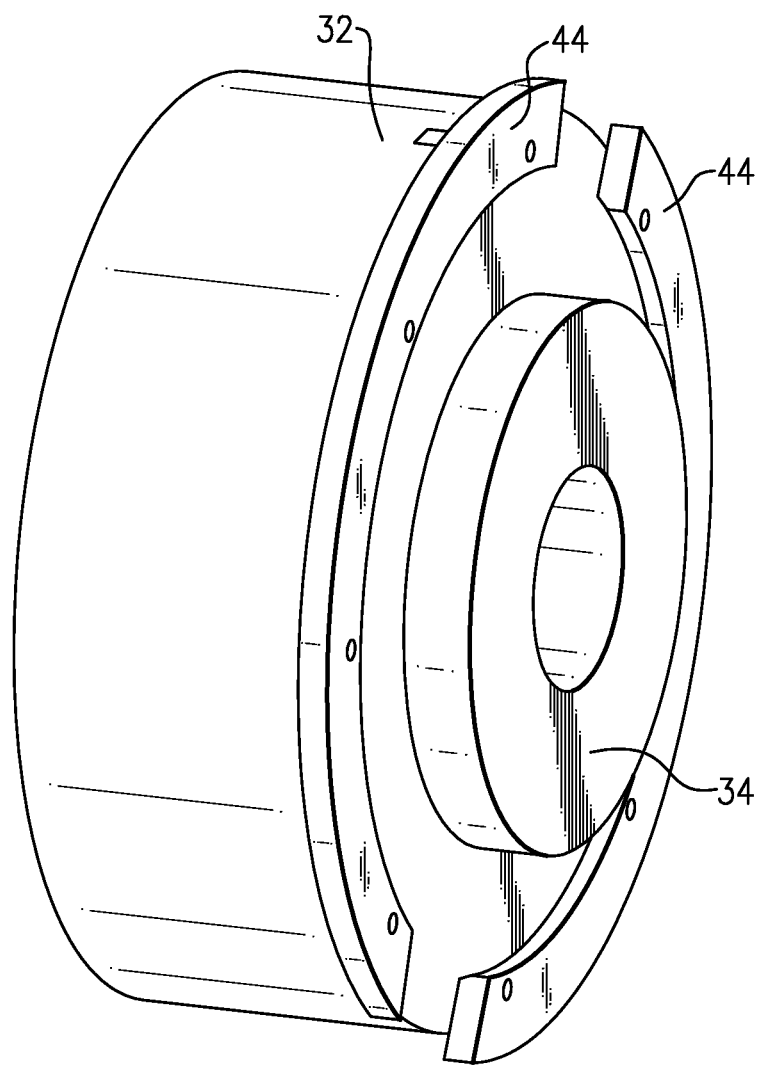
FIG. 5 shows an elastomeric ring.

As shown in FIG. 5, the elastomeric ring 44 may also be attached as two semi-cylindrical portions. The bolts 38 may extend through gaps between the elastomeric rings 44.

When the machine 20 is operating in a manner in which it is desirable to dampen the vibration between the housings 32 and 36, the adjustment member 50 is threaded further into the housing 42, and the piston 48 is biased outwardly, bringing the plate 46 into contact with the elastomeric ring 44 as shown in FIG. 2B. Vibration will be dampened. On the other hand, when conditions indicate that the dampening is not desirable; the adjustable member 50 is brought back to a release position such as shown in FIG. 2A.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A machine comprising:
    an outer housing receiving a drive shaft, at least one bearing housing supporting at least one bearing, said shaft being mounted within said at least one bearing, and said outer housing outward of said at least one bearing housing, at least one attachment member extending between said outer housing and said bearing housing;
    a selected damping system including an elastomeric ring attached to a surface on one of said bearing housing and said outer housing, and a selectively moveable plate connected to the other of said outer housing and said bearing housing, and said plate being selectively moveable by an adjustment member from a position at which it engages said elastomeric ring and to a point at which it is spaced from said elastomeric ring;
    said adjustment member being threaded, and being movable to achieve selective damping by turning said adjustment member in one direction to bring the plate to engage said elastomeric ring, and said adjustment member being moveable in an opposed direction to bring said plate to said point at which it is spaced from said elastomeric ring such that damping can be achieved or not utilized; and
    wherein an actuator member includes a piston which is driven by a spring to move said plate towards said elastomeric ring, and said adjustment member moving said piston.

2. The machine as set forth in claim 1, wherein the machine is for driving a component to be tested.

3. The machine as set forth in claim 2, wherein the component to be tested is a compressor rotor for a gas turbine engine.

4. The machine as set forth in claim 1, wherein said elastomeric ring including a pair of spaced elastomeric ring sections mounted to said one of said housings.

5. The machine as set forth in claim 1, wherein said plate includes a plurality of plate portions each including an actuator member.

6. The machine as set forth in claim 1, wherein said adjustment member may be adjusted to cause said piston to move inwardly or outwardly of an actuator housing to move said plate portions towards and away from said elastomeric ring.

7. The machine as set for in claim 6, wherein said adjustment member is threadably mounted within an actuator member housing.

8. A machine comprising:
    an outer housing receiving a drive shaft, at least one bearing housing supporting at least one bearing, said shaft being mounted within said at least one bearing, and said outer housing outward of said at least one bearing housing, at least one bolt extending between said outer housing and said bearing housing,
    a selected damping system including an elastomeric ring attached to a surface on one of said bearing housing and said outer housing, and a selectively moveable plate connected to the other of said outer housing and said bearing housing, and said plate being selectively moveable by an adjustment member from a position at which it engages said elastomeric ring and to a point at which it is spaced from said elastomeric ring,
    said adjustment member being threaded, and being movable to achieve selective damping by turning said adjustment member in one direction to bring the plate to engage said elastomeric ring, and said adjustment member being moveable in an opposed direction to bring said plate to said point at which it is spaced from said elastomeric ring such that damping can be achieved or not utilized,
    the component to be tested is a compressor rotor for a gas turbine engine,
    an actuator member includes a piston which is driven by a spring to move said plate towards said elastomeric ring, and said adjustment member moving said piston,
    wherein said adjustment member may be adjusted to cause said piston to move inwardly or outwardly of an actuator housing to move said plate portions towards and away from said elastomeric ring; and
    wherein said adjustment member is threadably mounted within an actuator member housing.

* * * * *